United States Patent
Degerman (10) Patent No.: US 11,164,461 B2
(45) Date of Patent: Nov. 2, 2021

(54) COOPERATIVE SENSING

(71) Applicant: EINRIDE AB, Stockholm (SE)

(72) Inventor: Pär Degerman, Gothenburg (SE)

(73) Assignee: Einride AB, Stockholm (SE)

( * ) Notice: Subject to any disclaimer, the term of this patent is extended or adjusted under 35 U.S.C. 154(b) by 0 days.

(21) Appl. No.: 16/955,107

(22) PCT Filed: Dec. 18, 2018

(86) PCT No.: PCT/EP2018/085410
§ 371 (c)(1),
(2) Date: Jun. 18, 2020

(87) PCT Pub. No.: WO2019/129535
PCT Pub. Date: Jul. 4, 2019

(65) Prior Publication Data
US 2020/0388159 A1    Dec. 10, 2020

(30) Foreign Application Priority Data
Dec. 28, 2017  (EP) .................................... 17210961

(51) Int. Cl.
*G08G 1/16*       (2006.01)
*G05D 1/02*       (2020.01)

(52) U.S. Cl.
CPC ............. *G08G 1/166* (2013.01); *G08G 1/163* (2013.01); *G05D 1/0291* (2013.01); *G05D 2201/0213* (2013.01)

(58) Field of Classification Search
CPC .......... G08G 1/166; G08G 1/163; G08G 1/22; G05D 1/0291; G05D 2201/0213
See application file for complete search history.

(56) References Cited

U.S. PATENT DOCUMENTS

2012/0022904 A1   1/2012  Mason et al.
2014/0104077 A1   4/2014  Engel et al.
(Continued)

FOREIGN PATENT DOCUMENTS

| GB | 2539422 B       | 12/2016 |
| WO | WO2011012882 A1 | 2/2011  |
| WO | WO2013166096 A1 | 11/2013 |

OTHER PUBLICATIONS

International Search Report and Written Opinion for PCT/EP2018/082667.
(Continued)

*Primary Examiner* — Ryan W Sherwin
(74) *Attorney, Agent, or Firm* — AWA Sweden AB; Thomas L. Ewing (57) ABSTRACT

Embodiments of the invention relate to a vehicle system for an autonomous or semi-autonomous motor vehicle, and a perception system for managing a plurality of interconnected motor vehicles. More specifically, the vehicle system has a control unit for retrieving a relative position of an object in a surrounding environment of the vehicle by means of a sensory system and for retrieving a heading of the motor vehicle. Furthermore, the control unit is configured to receive data from a different motor vehicle comprising the heading of the different motor vehicle and the position of the object relative to the different motor vehicle. The control unit is further configured to translate this external measurement to a local coordinate system in order to add redundancy to the measurement (and thereby accuracy) by utilizing a distributed system approach and therefore reduce the need for adding cost and complexity to each vehicle system in order to achieve increased accuracy.

20 Claims, 4 Drawing Sheets

(56) References Cited

U.S. PATENT DOCUMENTS

| | | |
|---|---|---|
| 2016/0247106 A1 | 8/2016 | Dalloro et al. |
| 2017/0178498 A1* | 6/2017 | Mcerlean ............... G08G 1/166 |
| 2017/0227369 A1 | 8/2017 | Wang et al. |
| 2017/0248963 A1 | 8/2017 | Levinson |
| 2018/0356837 A1* | 12/2018 | Lisewski ............... H04L 9/3213 |

OTHER PUBLICATIONS

International Search Report and Written Opinion for PCT/EP2018/085410.
Extended European Search Report for EP application 17210961.3-1204, dated Jun. 18, 2020.
International Preliminary Report on Patentability, PCT/EP2018/085410, dated Jun. 30, 2020.

\* cited by examiner

COOPERATIVE SENSING

CROSS-REFERENCE TO RELATED APPLICATIONS

This is a national phase application based on the PCT International Patent Application No. PCT/EP2018/085410 filed Dec. 18, 2018, itself claiming priority from EP 17210961.3 filed Dec. 28, 2017, the entire contents of both prior applications which are incorporated herein by reference.

TECHNICAL FIELD OF THE INVENTION

The present invention relates to a perception system for a plurality of interconnected motor vehicles, such as e.g. autonomous or semi-autonomous motor vehicles, and a vehicle system for an autonomous or semi-autonomous motor vehicle. Further, the present invention relates to a perception system whose aim is to increase reliability of a perception system for automated vehicles without adding complexity to the system.

BACKGROUND

Autonomous vehicles have been a hot topic during the last decade, and with the rapid pace of technological advancements being made in the area of computer science, it may very well soon become a reality.

However, a challenging aspect with autonomous vehicle is reliability, and in particular the reliability of the collected sensory data. In more detail, autonomous vehicle systems must perform perfectly to gain the trust of drivers and unknown factors like inclement weather, traffic conditions, other drivers, and unfamiliar terrain need to be considered as engineers develop technology. Furthermore, one also needs to account various data glitches or processing errors, as the consequences of one simple error may be devastating. Thus, in order to advance the autonomous vehicle industry from an experimental or prototypical form, existing technology in terms of sensors and computer-implemented intelligence must be further developed. In general, under existing technology, autonomous vehicles are capable of driving safely with other vehicles on roadways such as high ways, however, in more crowded conditions such as urban settings, challenges emerge because these crowded conditions can cause errors in interpretation of sensor information.

The normal way of increasing reliability in a system is by using redundancy. In this, a decision is made based on information from several, independent, sources. The challenge here is that system cost and complexity increases. There is also a trade-off between increasing redundancy, and adding more components to a system. It is well known that a more complex system, consisting of a higher number of components, is more prone to degraded operation due to a malfunction of any of the components.

Thus, there is a need in the art for a new and improved system for manging a plurality of interconnected autonomous or semi-autonomous vehicles which is reliable and safe.

SUMMARY OF THE INVENTION

It is therefore an object of the present invention to provide a perception system and a vehicle system, which alleviates all or at least some of the above-discussed drawbacks of the presently known systems by reducing state noise and upholding redundancy without adding unnecessary complexity to the system.

This object is achieved by means of a vehicle system and a perception system as defined in the appended claims.

In the following, the term exemplary is to be construed as serving as an example, instance or illustration.

According to a first aspect of the present invention, there is provided a vehicle system for an autonomous or semi-autonomous motor vehicle. The vehicle system comprises a sensory system comprising a plurality of sensors for generating vehicle data packets comprising information about a surrounding environment of the motor vehicle (may for the sake of convenience be referred to as vehicle A), and a localization system for generating localization data packets related to the motor vehicle (vehicle A). The localization data packets comprise at least one of a heading of said motor vehicle and geographical coordinates of the motor vehicle (vehicle A). The vehicle system further has a communication system for wirelessly transmitting and receiving data to/from at least one other motor vehicle, and a control unit operatively connected to the sensory system, the localization system and the communication system. The control unit is configured to:

retrieve a first measurement comprising a position of an object in said surrounding environment relative to said motor vehicle (vehicle A) by means of said sensory system;

retrieve the heading and/or the geographical coordinates of the motor vehicle (vehicle A);

receive external vehicle data packets and external localization data packets from a different motor vehicle (may for the sake of convenience be referred to as vehicle B), the external vehicle data packets comprising a second measurement comprising a position of the object relative to the different motor vehicle and the external localization data packets comprising at least one of a heading of the different motor vehicle and geographical coordinates of the different motor vehicle;

retrieve a third measurement comprising a position of the different motor vehicle (vehicle B) relative to the motor vehicle (vehicle A) by means of the sensory system;

translate the external vehicle data packets to a local coordinate system by comparing the third measurement, the localization data packets and the external localization data packets; and process the translated external vehicle data packets and the vehicle data packets in order to generate a probable position of the object.

The vehicle system accordingly allows for improved redundancy in measurements of the surrounding environment by utilizing sensory data from other vehicles as well as improved information reliability/accuracy by minimizing signal noise (by delaying any coordinate transformations to the receiving side). The inventive system is particularly useful for a vehicle fleet comprising autonomous and/or semi-autonomous vehicles.

Different motor vehicle in the present context to be construed as that it is a vehicle other than the first motor vehicle, i.e. the vehicle may still be of the same model or type.

Information about the surrounding environment is to be understood as measurements by means of e.g. radar, cameras, etc. of surrounding objects (other vehicles, buildings, obstructions, etc.) relative to the actual vehicle. For example, an unknown object (e.g. a bus) is in front of a vehicle associated with the system (i.e. vehicle B). Then vehicle B will send vehicle data packets comprising information about the unknown object relative to itself (vehicle B), such as e.g. the unknown object is 15 m, 37° to the right of vehicle B. This data is then received by a first motor vehicle which is associated with the same system (i.e. vehicle A). Alternatively, the vehicle data packets may be sent to a system node, however, this will be discussed in further detail with respect to another aspect of the invention.

Moving on, vehicle data packets are transmitted from a motor vehicle (e.g. after a request), whereby the receiver (i.e. vehicle A) can use this data for various applications. More specifically, by using the measurement conducted by the external/different motor vehicle (vehicle B), and transforming this data to the local coordinate system of the receiving vehicle (vehicle A) the redundancy of sensor measurements is improved. More specifically, by using the external localization data, the first motor vehicle (vehicle A) can translate the measurement conducted by the external vehicle's (vehicle B's) sensors into its own local coordinate system (i.e. to be in reference to itself). For example, the external measurement may after translation say that the unknown object is 75 m and 14° to the right of the motor vehicle (vehicle A), which may or may not confirm the measurement performed by an internal sensory system of vehicle A. Naturally, a larger number of external measurements may be received in order to further add redundancy, either by other vehicles associated with the same system or stationary sensors positioned at strategic locations (e.g. busy intersections, densely trafficked roads, etc.)

By means of the inventive vehicle system it is possible to achieve increased reliability of the information of the surrounding environment as compared to a system where the measurement of the unknown object is (before being sent/received) combined with a geographical position (e.g. GPS position) of the sender. The addition of geographical data would negatively affect the relative measurement by adding noise (uncertainties) to the measurement. In more detail, if geographical data is integrated, then the receiving vehicle (vehicle A) will have to make a reverse transformation in order to find out the relative distance between external vehicle (vehicle B) and the unknown object which drastically reduces the accuracy of the data.

Stated differently, with the inventive system each motor vehicle receives data saying that the unknown object is N meters and M° to the right of a connected motor vehicle, instead of receiving data saying that the unknown object is e.g. L km northeast of city A on road X, where the tolerances of the GNSS (Global Navigation Satellite System) unit adds noise to the data. This may be particularly useful in situations where a motor vehicle (vehicle A) can measure the position a different motor vehicle (vehicle B) (e.g. urban environment) as well as the position of the unknown object (both measurements relative to vehicle A) but wants to add further redundancy to its own measurement of the unknown object.

The present inventor realized that by using a concept of cooperative sensing and decision making, the robustness, performance, and redundancy of perception systems for autonomous motor vehicles can be improved. The present invention considers a set of vehicles all running in a well-coordinated fashion and benefiting from the fact that they are all part of a common system. Entities within this common system can exchange information between each other. As mentioned, the vehicle system makes use of a distributed approach to overcome redundancy requirements without the overhead of a costlier and more complex system architecture. Due to the specifics in the information propagation (e.g. no overlaying of geographical coordinates) signal noise levels are kept as low as feasible.

In the present context mainly two different coordinate systems are discussed, namely a vehicle local coordinate system and a global latitudinal/longitudinal coordinate system. The former (local coordinate system) uses an individual vehicle has reference point, i.e. all measurements are expressed relative to the individual vehicle, while the latter (global coordinate system) expresses the position of an object in "global" latitudinal and longitudinal coordinates (e.g. GPS coordinates). Additionally, a "shared coordinate system" may be employed, which means that it is a coordinate system that is shared by a plurality of vehicles yet not a "global reference", such as for example a UTM (Universal Transverse Mercator) zone.

Moving on, in accordance with an exemplary embodiment of the present invention, the localization data packets comprise both the heading and the geographical coordinates of said motor vehicle and the external localization data packets comprise both the heading and the geographical coordinates of said different motor vehicle. Hereby, it is possible to add further redundancy to the transformation or translation from the external vehicle's local coordinate system to the receiving vehicle's local coordinate system. This is because a means to perform the transformation is provided (global geographical coordinates) in addition to the relative measurement between the two connected vehicles and their headings.

Moreover, in an exemplary embodiment of the present invention, the external vehicle data packets and the external localization packets are separate data packets. In other words, this means that the heading and/or the global latitudinal/longitudinal coordinates of the different motor vehicle are separated from the vehicle data packets such that the geographical coordinates are not added on top of the information regarding the surrounding environment. More specifically, the received information separately says that the different vehicle is located at XX and YY global lat./lon. coordinates and that there is a bus located 40 m straight in front of the external vehicle, instead of receiving that a bus is located at WW and ZZ global lat./lon. coordinates.

Further, in another exemplary embodiment of the present invention, control unit is configured to filter the vehicle data packets by means of a probabilistic filter in order to remove any anomalies in the retrieved information about a surrounding environment of the motor vehicle. A probabilistic filter bank may for example be a bank of extended Kalman filters. Anomalies may for example be false positives or false negatives. This may be construed as a pre-treatment stage before any information is transmitted to other vehicles or nodes within the system. An advantage is that this can reduce the sharing/spreading of obvious errors.

Moving on, in accordance with yet another exemplary embodiment of the present invention, the control unit is further configured to retrieve an intended state of the motor vehicle, wherein the intended state comprises a path prediction and/or a planned route of the motor vehicle; and wherein the external vehicle data packets comprise an intended state of the different motor vehicle comprising a path prediction and/or a planned route of the different motor vehicle. This adds further redundancy to the system since the intentions of each vehicle can be considered as independent sources of information.

Further, in accordance with another aspect of the present invention, there is provided a perception system for managing a plurality of interconnected motor vehicles where each of said plurality of interconnected motor vehicles comprises a vehicle system in accordance with any one of the above discussed embodiments. The perception system comprises:

communication circuitry for transmitting and receiving data packets to and from each of said interconnected motor vehicles;

a control unit connected to the communication circuitry, and configured to:

receive a set of vehicle data packets from each of said plurality of interconnected motor vehicles, each set of vehicle data packets comprising information about a surrounding environment of an associated motor vehicle;

combine and filter the received vehicle data packets by means of a probabilistic filter such that a set of processed data packets is formed, the processed data packets comprising a probable vehicle state of a predefined motor vehicle of the plurality of motor vehicles; and transmit the processed data packets to at least one motor vehicle of the plurality of motor vehicles.

With this aspect of the invention, similar advantages and preferred features are present as in the previously discussed first aspect of the invention and vice versa. By using a higher level system node, managing a plurality of motor vehicles, a higher level of abstraction is possible and more robust information can be generated. This is at least partly because the system can be aware of any differing properties of each motor vehicle of the system as well as the overall mission of the system. As mentioned, the system makes use of a distributed approach to overcome redundancy requirements without the overhead of a costlier and more complex in-vehicle architecture.

In more detail, the verified information may accordingly be transmitted back to the relevant motor vehicle (i.e. the vehicle whose measurements have been verified) or to a different motor vehicle within the same system.

Moving on, the perception system receives information from the plurality of motor vehicles, and the control unit processes that by means of a bank of probabilistic filters. The controller may be further configured to consider that coordinate transformations into a shared or global coordinate system is to be applied for any incoming information. This coordinate transformation is advantageous, because most environment perception sensors (on the vehicles) work in the vehicle local coordinate system (e.g. making measurements relative to the actual vehicle). Moreover, by delaying the coordinate transformation to the receiving side (here the perception system) instead of the sender side several advantages are achievable. For example, the chosen coordinate system can be optimized to the set of vehicles in question and the type of filtering that will be applied to the information. This constitutes, for example selecting a UTM zone common to all vehicles, i.e. transforming to a shared coordinate system. Further, more information of vehicle states (surrounding environment, historical data, intended paths, etc.) can be incorporated into the transformation, giving a less noisy, more reliable vehicle state. Moreover, the computing power at the system level might be higher and more scalable than that of the individual motor vehicles.

Moving on, in accordance with another embodiment of the present invention, the perception system's control unit may be further configured to:

receive a set of localization data packets from each of the plurality of interconnected motor vehicles, each set of localization data packets comprising geographical coordinates of each respective motor vehicle;

determine an application for the received vehicle data packets, and based on the determined application the control unit is configured to:

before transmitting the processed data packets, transform the processed data packets to be in reference to a global geographical system, or transform the processed data packets to be in reference to a shared coordinate system, said shared coordinate system being common to a subgroup of said plurality of interconnected motor vehicles, or transform the processed data packets such that the information about a surrounding environment is relative to a local coordinate system of the predefined motor vehicle out of the plurality of interconnected motor vehicles.

This coordinate transformation is advantageous, because most environment perception sensors work in the vehicle local coordinate system. Thus, by delaying the coordinate transformation to the receiving side instead of the sender side several advantages are achievable in terms of optimization of the selected coordinate system, information accuracy since more information can be incorporated prior to any transformation, and processing power since the computing power may be higher at the perception system level. In other words, it is advantageous to use the raw un-tampered measurements in the filtering step instead of having to perform backwards or forward coordinate transformations prior to filtering which will add uncertainties to the data.

In accordance with yet another aspect of the present invention, there is provided a perception system for managing a plurality of interconnected motor vehicles, the perception system comprising:

communication circuitry for transmitting and receiving data packets to and from at least one of said interconnected motor vehicles;

a control unit connected to said communication circuitry, said control unit being configured to:

receive a set of vehicle data packets from each of said plurality of interconnected motor vehicles each set of vehicle data packets comprising information about a surrounding environment of an associated motor vehicle;

receive a set of localization data packets from each of said plurality of interconnected motor vehicles, said localization data packets comprising a heading and/or geographical coordinates of each motor vehicle;

determine an application for the received vehicle data packets; and based on the determined application:

filter said received sets of vehicle data packets by means of a probabilistic filter such that a set of processed data packets is formed; and transform said processed data packets such that said information about a surrounding environment is relative to a geographical coordinate system, or transform the processed data packets to be in reference to a shared coordinate system, said shared coordinate system being common to a subgroup of said plurality of interconnected motor vehicles, or transform said processed data packets such that said information about a surrounding environment is relative to a local coordinate system of a predefined motor vehicle out of said plurality of interconnected motor vehicles.

With this aspect of the invention, similar advantages and preferred or example features are present as in the previously discussed aspects of the invention. The filtered set of data packets preferably contain less anomalies than the sets of (unfiltered) vehicle data packets.

These and other features of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Figure 1:
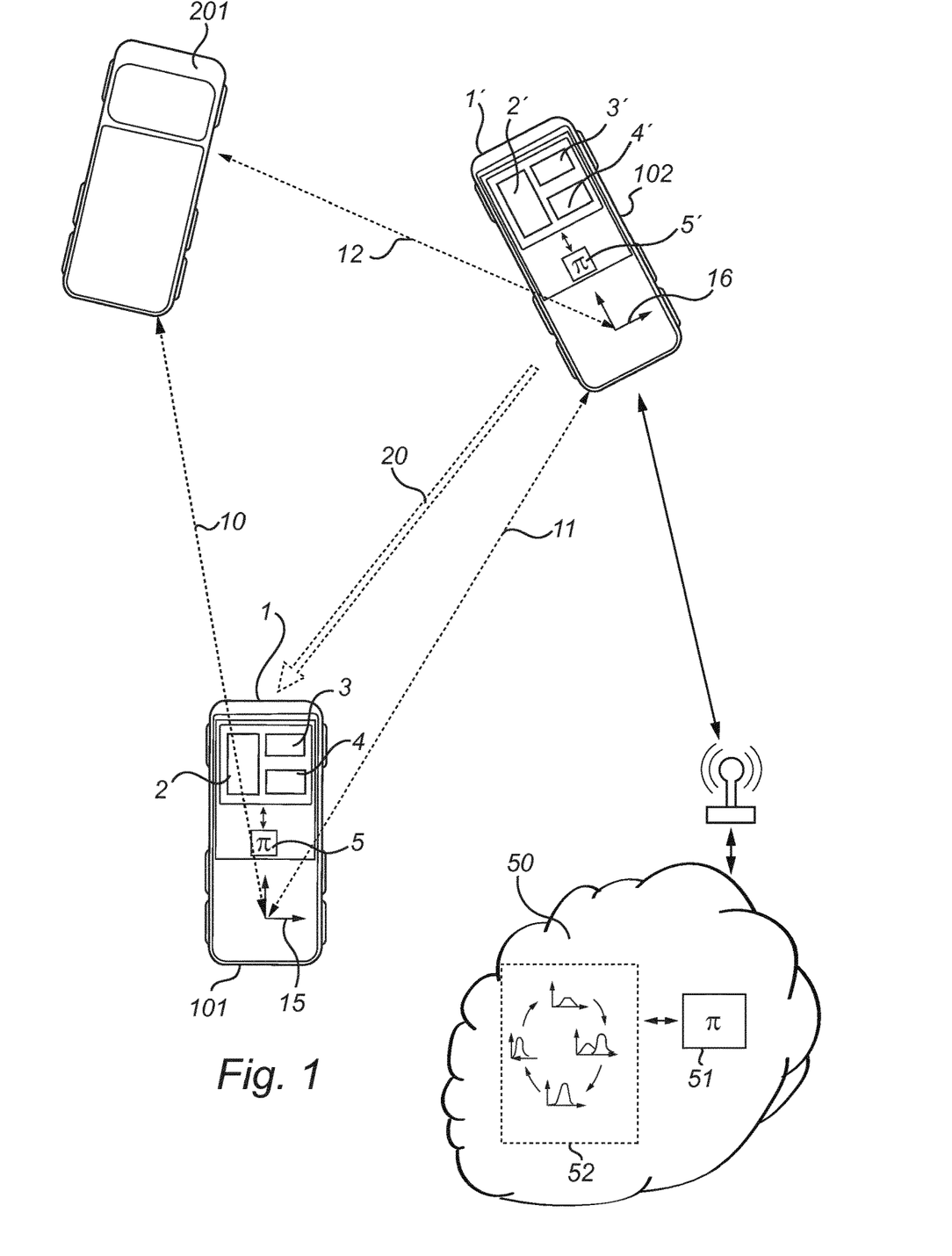
FIG. 1 is a schematic block representation of a vehicle system in accordance with an embodiment of the present invention.

FIG. 1 is a schematic overview illustration of a vehicle system 1 in accordance with an embodiment of the present invention. In the illustrated embodiment there are two vehicles 101, 102 which are in communicative connection with each other and associated with the overall perception system 50 (represented as a cloud-based system herein) for managing a plurality of connected vehicles. Naturally there may be even additional motor vehicles taking part of the same system, however, for the sake of brevity and conciseness, only two motor vehicles are provided in the illustrated embodiment.

In the following and in reference to FIG. 1, the invention will be mainly described from one of the vehicles' perspective, namely the "first" vehicle 101. The two motor vehicles 101, 102 are suitably autonomous or semi-autonomous vehicles.

The vehicle system 1 has a sensory system 2 comprising a plurality of sensors for generating information about a surrounding environment of the vehicle 101. The sensors may e.g. be radar, cameras, LiDAR (Light Detection and Ranging), etc. The sensory system 2 is used to measure and retrieve data related to positions of various objects surrounding the motor vehicle 101, e.g. the distance to these objects relative to the motor vehicle 101. Further, the vehicle system 1 has a localization system 3 for generating localization data packets related to the motor vehicle 101. The localization data packets may for example be geographical coordinates retrieved by means of e.g. a GNSS (Global Navigation Satellite System) such as e.g. GPS, GLONASS, GALILEO, etc. However, the localization data may additionally or alternatively be a heading of the motor vehicle 101 retrieved by means of e.g. a compass.

The vehicle system 1 also has a communication system 4 for wirelessly transmitting and receiving data to/from at least one other motor vehicle 102. The communication system may be any type of suitable communication system capable of transmitting and receiving by means of e.g. electromagnetic waves, such as a radio transceiver or the like. The same communication system 4 is preferably also operable for transmitting and receiving wireless data to and from a perception system 50 associated with the motor vehicle 101.

Furthermore, the vehicle system 1 has a control unit 5 operatively connected to the sensory system 2, the localization system 3, and the communication system 4. It is obvious that parts or all of these various sub-systems may be integrated into a single system, thus, such obvious alterations are considered to be within the scope of the present invention and the appended independent claims. Moving on, the control unit 5 is configured to execute or perform a certain set of tasks so to add redundancy to the measurements of the motor vehicle's 101 surrounding environment and thereby generate a more accurate perception or image of the surrounding environment. More specifically, the control unit 5 is configured to retrieve a position of an object 201 in the surrounding environment by means of the sensory system 2 as indicated by the dashed line 10, and from that generate vehicle data packets which include the position of the object 201 relative to the motor vehicle 101. In other words, the position of the object 201 is defined in a local coordinate system 15 of the vehicle, e.g. the object's position is (148 m, −15°) [101]. The two data points define the absolute distance to the object 201 and its location relative to the motor vehicle 101, where 0° can be considered straight in front of the motor vehicle 101, and the number within the brackets serve to clarify that it is within the first vehicle's 101 local coordinate system. The control unit 5 is also configured to retrieve the heading and/or the geographical coordinates of the vehicle 101 from the localization system 3.

Further, the control unit 5 is configured to receive (as indicated by arrow 20) external vehicle data packets and external localization data packets from a different motor vehicle 102. The external vehicle data packets comprise a measurement of the object's 201 position relative to the different motor vehicle 102, i.e. positional data of the object in a local coordinate system 16 of the different motor vehicle 102. For example, the external vehicle data may say that the object 201 is located at (43 m, −38°) [102] relative to the different motor vehicle 102. Different motor vehicle in this context is to be construed as that it is a vehicle other than the first motor vehicle 101, i.e. the vehicle may still be of the same model or type. The received external localization data packets comprise a heading and/or geographical coordinates (e.g. GPS coordinates) of the different motor vehicle 102.

The control unit 5 further utilizes the sensory system 2 to retrieve a position of the different motor vehicle 102 relative to the first motor vehicle 101. In other words, the position of the different motor vehicle expressed within the first vehicle's 101 coordinate system, e.g. (74 m, 23°) [101]. It should be noted that the numbers indicating measurement values here are merely approximate examples, and not intended to be to scale.

Moving on, the external vehicle data packets are translated to a local coordinate system 15 (of the relevant vehicle, i.e. the first vehicle 101), by comparing the relative position of the different motor vehicle, i.e. (74 m, 23 DEG), with the heading and/or the geographical coordinates of the first motor vehicle 101, and with the heading and/or the geographical coordinates of the different motor vehicle 102. This operation results in a translation of the measurement 12 of the object 201 made by the different motor vehicle 102, into the local coordinate system 15 of the first motor vehicle, whereby the control unit 5 can fuse these two measurements together by means of a sensor fusion operation and thereby generate a probable position of the object. In other words, the two measurements 10, 12 are redundant measurements of the same object's position. Thus, redundancy has been added to the system without adding complexity or any significant cost to the in-vehicle system 1 of each vehicle 101, 102. Even though the foregoing has been explained from the perspective of the first motor vehicle 101, however, the description is analogously applicable on the different motor vehicle 102 employing the same system 1'.

Figure 2A:
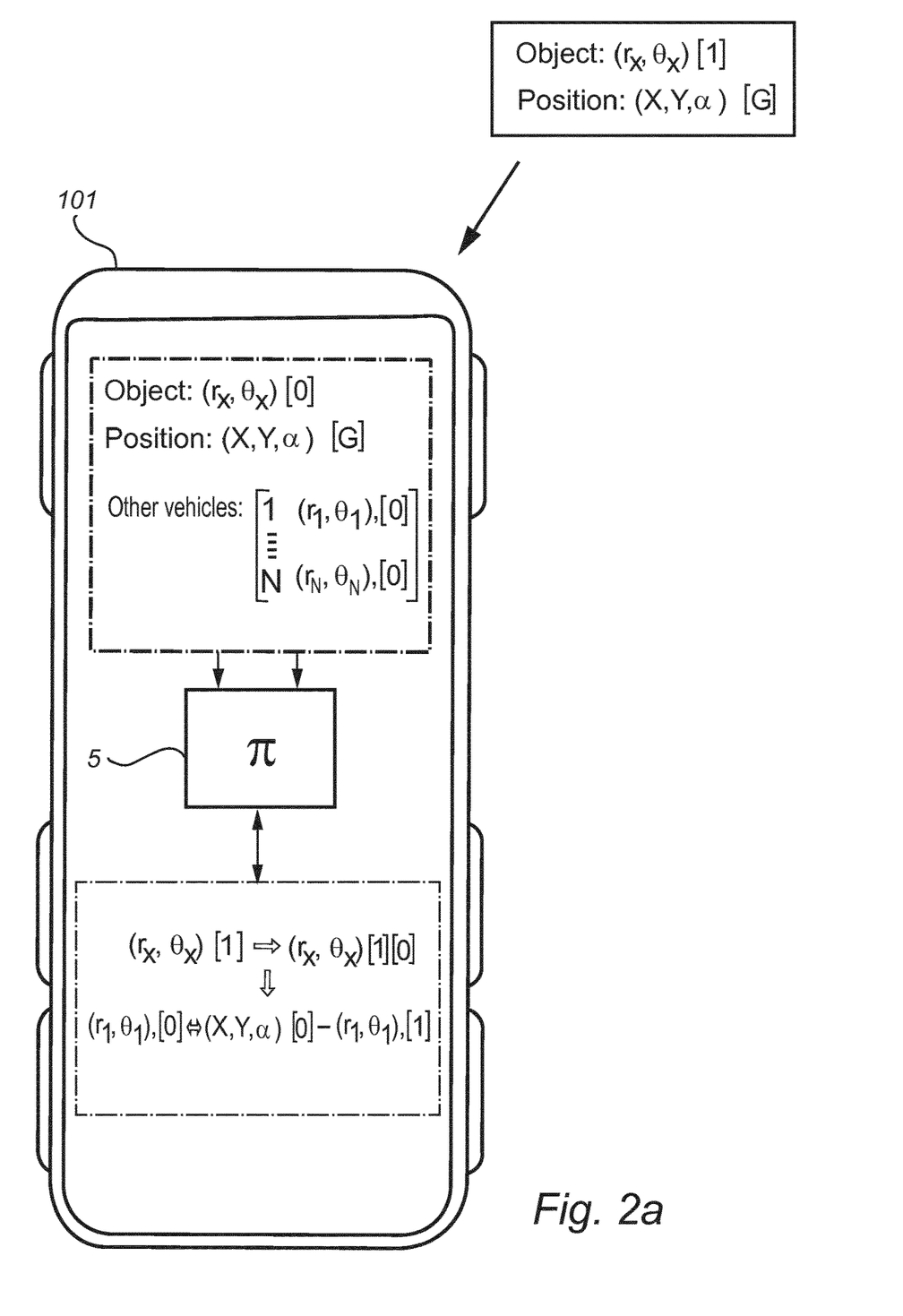
FIG. 2A is a schematic block representation of a control unit comprised in a vehicle system in accordance with an embodiment of the present invention.

An example of the data generation, transfer and processing is shown in further detail in FIG. 2A. The vehicle system 1 can generate a number of different data sets, namely:

A position of an object X relative to the associated vehicle 101 which is indicated by the measurement reference [0]: $(r_x, \Theta_x)[0]$.

A position of the actual vehicle in the form of coordinates and a heading: $(X, Y, \alpha)[G]$, where the G denotes that the position is in reference to a global geographical coordinate system.

A position of other vehicles 1 . . . N relative to the associated vehicle 101: $(r_1, \Theta_1)[101]$ . . . $(r_N, \Theta_N)[0]$.

Further, as previously described in detail, the vehicle system 1 receive data from other vehicles, in the illustrated example of FIG. 2A only one other data set is illustrated containing a position of the same object X, relative to this other vehicle, whose local coordinate system is denoted as [1], and a position of this other vehicle in a global geographical coordinate system. As indicated in the dashed box below the control unit 5 of the system 1, the control unit is configured to transform the received measurement $(r_x, \Theta_x)$[1] to its own local coordinate system $(r_x, \Theta_x)$[1][0] by using the geographical data $(X, Y, \alpha)[G]$; $(X_1, Y_1, \alpha_1)[G]$), as well as the direct measurement of the position this other vehicle $(r_1, \Theta_1)[0]$. By employing this procedure, the reliability of the measurement of the object's X position relative to the associated vehicle 101 is increased without adding complexity or cost to the sensory system of each motor vehicle.

The external vehicle data packets and said external localization data packets are sent 20 as separate data packets, which means that e.g. the geographical coordinates and/or the heading of the different motor vehicle 102 are not integrated with the information regarding the surrounding environment. More specifically, instead of sending data e.g. saying that the object 201 is located 30 km northeast of city A on road M, the vehicle system 1, 1' is arranged such that it says that the object 201 is located at XX relative to the different motor vehicle 102 and that the different motor vehicle is located at YY. In other words, any coordinate transformations or translation are done at the receiving side which reduces noise and therefore uncertainties in the measurement 12.

Moreover, the control unit 5, 5' may be configured to pre-treat the vehicle data packets by filtering the vehicle data packets by means of a probabilistic filter (e.g. Kalman filters) in order to remove outliers and other measurements errors from the retrieved information 10, 12 about the surrounding environment. Advantageously, the control unit 5, 5' may also be configured to perform regular diagnostic checks in order to validate the operational capability of on-board sensors, compress and package data in order to enable transfer (to other vehicles 101, 102 or to a system node 50) over slow, unreliable and expensive networks.

Yet further, the control unit 5, 5' may be configured to retrieve an intended state of the motor vehicle 101, 102 where the intended state includes a path prediction and/or a planned route of the motor vehicle 101, 102. Accordingly, the external vehicle data packets (received by the first motor vehicle 101) may comprise an intended state of the different motor vehicle 102. This adds even further redundancy to the system 1 since the intentions of each vehicle 101, 102 can be considered as independent sources of information.

Figure 2B:
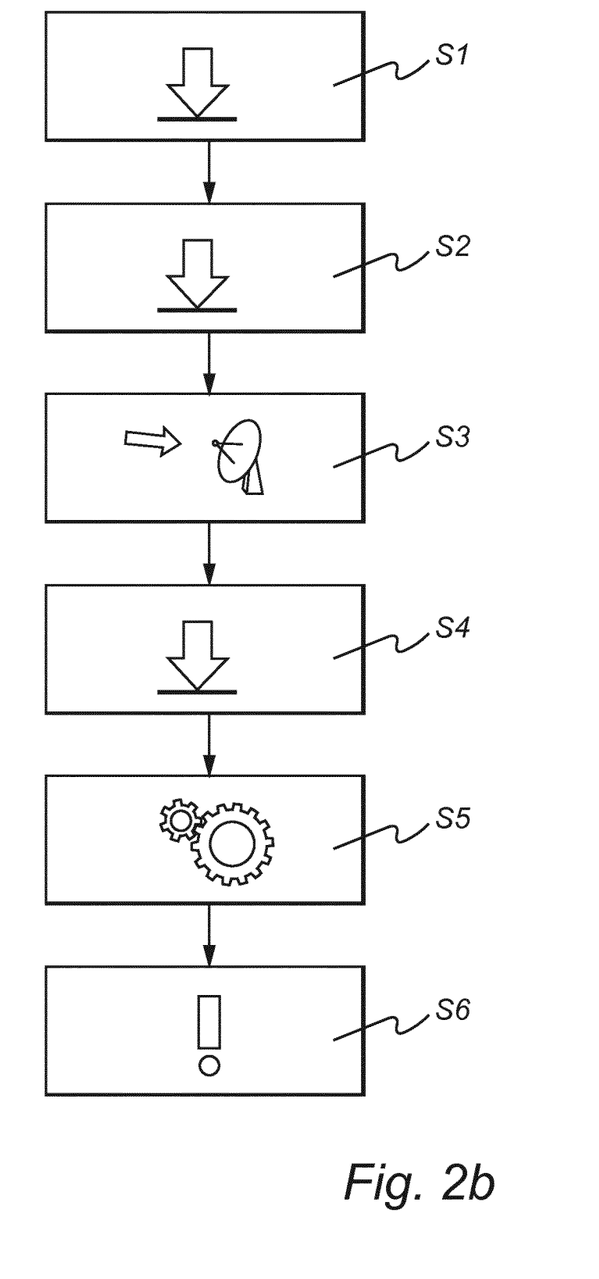
FIG. 2B is a schematic flow chart representation of a set of operational steps which a control unit of a vehicle system is configured to perform in accordance with an embodiment of the present invention.

FIG. 2B is a flow chart representation of a method (may also be understood as a process or a set of functions) which a control unit (ref. 5, 5' in FIG. 1) can be configured to perform, in accordance with an embodiment of the invention. The method aims to increase redundancy in a vehicle perception system without necessarily adding complexity or significant cost to the system. Accordingly, the flow chart can be considered to represent a set of instructions which can be stored on a non-transitory computer readable medium (arranged in a vehicle), such that when executed by a computing system, the computing system performs functions comprising retrieving S1 a measurement of a position of an object in the surrounding environment of the motor vehicle, by means of a sensory system of the vehicle, so to generate vehicle data packets comprising the position of the object relative to the motor vehicle.

Further, a heading of the vehicle is retrieved S2. In this step S2, a position of the vehicle, expressed in global/shared geographical coordinates, may additionally or alternatively be retrieved. Next, external vehicle data packets and external localization data packets from a different motor vehicle are received S3. The external vehicle data packets include a measurement of a position of the object relative to this different motor vehicle, and the external localization data packets include a heading of the different motor vehicle (and alternatively or additionally also the geographical coordinates of the different motor vehicle).

Yet further, a measurement of a position of the different motor vehicle relative to the motor vehicle (which is performing the method/process) is retrieved S4, e.g. by means of a suitable sensor. The external vehicle data packets are then translated S5 or transformed S5 from the local coordinate system of the different motor vehicle to the local coordinate system of the motor vehicle (which is performing the method/process). This is performed by comparing the position of the different motor vehicle relative to the "executing" motor vehicle, and at least the heading of the motor vehicle and the heading of the different motor vehicle. As an addition or alternative, the geographical coordinates of each motor vehicle may be used. Thereby, the computing system can generate a probable position of the object by comparing S6 (using sensor data fusion) the two measurements of the object which have been performed by two different sensory systems but have been processed such that they are in respect to the same local coordinate system.

Moreover, FIG. 1 also illustrates a schematic overview of a perception system 50 for managing a plurality of interconnected motor vehicles 101, 102. The perception comprises a control unit 51 configured to receive a set of a vehicle data packets (e.g. by means of a suitable transceiver) from each of the plurality of interconnected motor vehicles 101, 102. The vehicle data packets comprise information about a surrounding environment of each respective motor vehicle 101, 102. The control unit is then configured to combine and filter the received vehicle data packets by means of a probabilistic filter (as indicated in the dashed box 52 of FIG. 1) such that a set of processed data packets is formed. The processed data packets comprise a probable vehicle state of a first (predefined) motor vehicle 101 out of the plurality of motor vehicles 101, 102. The probable state comprises verified information about the surrounding environment of the first motor vehicle 101. The processed data packets may accordingly be transmitted to any one vehicle 101, 102 within the associated vehicle fleet, or simply broadcasted to all vehicles 101, 102. By using a system level node 50 to process the vehicle data packets a higher level of abstraction is possible and more robust information is generated on system level, because the system 50 is aware of the differing properties of each vehicle 101, 102 the overall mission of the fleet. In other words, the system utilizes a distributed approach to overcome redundancy requirements without the overhead of a costlier and more complex in-vehicle architecture. Another advantage that is achievable by doing the combination and filtering at the system level is that the computing power of the system level 50 might be higher and more scalable than that of the motor vehicles 101, 102.

Further, the control unit of the perception system may also be configured to determine an application for the received data packets. This is in order to make for application specific decisions. For example, in some applications it may be suitable to transform each measurement of the surrounding environment from a local coordinate system (i.e. relative to each vehicle) to a global coordinate system (i.e. relative to global geographical coordinates). The latter may e.g. be advantageous when the system level node 50 is to broadcast the verified measurements from each vehicle 101, 102, whereby each vehicle 101, 102 can readily apply the received data without performing any additional transformations. Alternatively, it may be determined that it is suitable to transform one or more measurements to a local coordinate system 15, 16 of a predefined vehicle 101, 102. Thus, the coordinate transformation may be performed at the system level 50 instead of locally within each vehicle 101, 102. As previously discussed, delaying the coordinate transformation to the receiving side (i.e. the system node 50) instead of the sender side (i.e. the vehicles 101, 102) has several advantages, such as e.g. that the chosen common coordinate system can be optimized to the set of vehicles in question and the type of filtering that will be applied to the information (e.g. by selecting a UTM zone common to all vehicles), and that more information of vehicle states can be incorporated into the transformation, giving a less noisy, more reliable vehicle state, and that computing power of the system level might be higher and more scalable than that of the vehicles.

Figure 3:
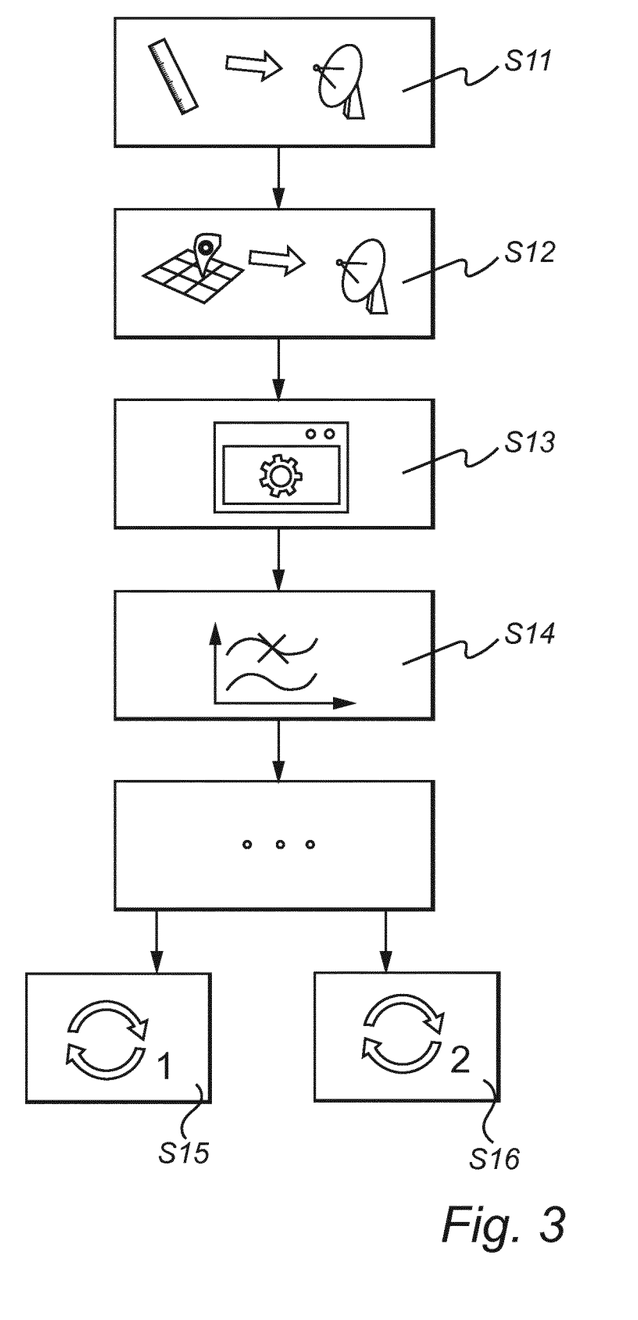
FIG. 3 is a schematic flow chart representation of a set of operational steps which a control unit of a perception system is configured to perform in accordance with an embodiment of the present invention.

FIG. 3 is a flow chart representation of a set of operational steps which a control unit of a perception system is configured to perform in accordance with an embodiment of the present invention. The perception system is suitable for managing a plurality of interconnected motor vehicles, preferably autonomous or semi-autonomous vehicles. The following "steps" S11-S16 may also be construed as a method for interpreting and handling data received from sensory systems of a plurality of motor vehicles.

Accordingly, the control unit is configured to receive S11 a set of vehicle data packets from each of the plurality of interconnected motor vehicles, each set of vehicle data packets being retrieved from a sensory system of each motor vehicle, wherein the vehicle data packets comprise information about a surrounding environment of the motor vehicle relative to the motor vehicle. In other words, the information is in reference to a local coordinate system of each respective motor vehicle (e.g. unknown object is located 30 m 35° to the right). Further, a set of localization data packets is received S12 from each of the plurality of interconnected motor vehicles, the localization data packets comprising geographical coordinates of each motor vehicle. An application for the received vehicle data packets is determined S13, in order to allow for application specific data processing and consequently perception system optimization. Moreover, the received sets of vehicle data packets are filtered S14 by means of a probabilistic filter (e.g. Kalman filter) such that a filtered set of data packets is formed, the filtered set of data packets containing less anomalies than the sets of vehicle data packets. The filtering may also consider received intentions of the motor vehicles to add information redundancy.

Moreover, based on the determined S13 application the vehicle data packets are either transformed S15 to be relative to a geographical coordinate system (e.g. GNSS) or transformed S16 to be relative to a local coordinate system of a predefined motor vehicle out of the plurality of interconnected motor vehicles.

The invention has now been described with reference to specific embodiments. However, several variations of the vehicle system and perception system are feasible. For example, only a portion of the data received by a vehicle from a system node may be considered in order to avoid processing information that is of no importance. Moreover, a simpler filtering approach may be applied in the vehicle system as compared to the one in the perception system since processing power may be limited within the vehicle systems. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A vehicle system for an autonomous or semi-autonomous motor vehicle, comprising:
- a sensory system comprising a plurality of sensors that generate vehicle data packets comprising information about a surrounding environment of the motor vehicle;
- a localization system that generates localization data packets related to the motor vehicle, the localization data packets comprising at least one of a heading of the motor vehicle and geographical coordinates of the motor vehicle;
- a communication system that wirelessly transmits and receives data to/from at least another motor vehicle;

a computerized control unit operatively connected to the sensory system, the localization system, and the communication system, the computerized control unit configured to:

retrieve a first measurement of a position of an object in the surrounding environment relative to the motor vehicle from the sensory system in a first local coordinate system;

retrieve the heading and/or the geographical coordinates of the motor vehicle in a global coordinate system;

receive external vehicle data packets and external localization data packets from a different motor vehicle, the external vehicle data packets comprising a second measurement of a position of the object relative to the different motor vehicle in a second local coordinate system and the external localization data packets comprising at least one of a heading of the different motor vehicle and geographical coordinates of the different motor vehicle in the global coordinate system;

retrieve a position of the different motor vehicle relative to the motor vehicle from the sensory system in the first local coordinate system;

translate the external vehicle data packets to the first local coordinate system by comparing the position of the different motor vehicle relative to the motor vehicle, the localization data packets in the second local coordinate system and the external localization data packets in the global coordinate system; and process the translated external vehicle data packets and the vehicle data packets to generate a probable position of the object in the first local coordinate system.

2. The vehicle system of claim 1, wherein the localization data packets comprise the heading and the geographical coordinates of the motor vehicle, and wherein the external localization data packets comprise the heading and the geographical coordinates of the different motor vehicle.

3. The vehicle system of claim 1, wherein the external vehicle data packets and the external localization packets are separate data packets.

4. The vehicle system of claim 1, wherein the computerized control unit filters the vehicle data packets using a probabilistic filter that removes anomalies in the retrieved information about a surrounding environment of the motor vehicle.

5. The vehicle system of claim 1, wherein the motor vehicle and the different motor vehicle are one of autonomous motor vehicles and semi-autonomous vehicles.

6. The vehicle system of claim 1, wherein the computerized control unit is further configured to retrieve a predetermined intended state of the motor vehicle, wherein the predetermined intended state comprises a path prediction and/or a planned route of the motor vehicle;

wherein the external vehicle data packets comprise an intended state of the different motor vehicle comprising a path prediction and/or a planned route of the different motor vehicle; and wherein the computerized control unit compares the predetermined intended state of the motor vehicle with the intended state of the different motor vehicle.

7. The vehicle system of claim 1 wherein at least one sensor in the sensory system comprises one of a radar, a camera, and a LiDAR device.

8. The vehicle system of claim 1 wherein the localization system retrieves data from one of a compass and a Global Navigation Satellite System to generate the localization data packets.

9. The vehicle system of claim 1 wherein the communication system comprises a radio transceiver.

10. The vehicle system of claim 1, wherein the probabilistic filter comprises a Kalman filter.

11. The vehicle system of claim 1, wherein the computerized control unit comprises a raspberry pi computer.

12. A perception system for managing a plurality of interconnected motor vehicles, the perception system comprising:

communication circuitry that transmits and receives data packets to and from each of the interconnected motor vehicles;

a computerized control unit connected to the communication circuitry, the computerized control unit configured to:

receive a set of vehicle data packets from each of the plurality of interconnected motor vehicles, each set of vehicle data packets comprising information about a surrounding environment of an associated motor vehicle of the plurality of interconnected motor vehicles in a coordinate system local to an interconnected motor vehicle of the plurality of motor vehicles;

combine and filter the received vehicle data packets from the plurality of interconnected motor vehicles using a probabilistic filter to form a set of processed data packets, the processed data packets comprising a probable vehicle state of a predefined motor vehicle of the plurality of motor vehicles; and transmit the processed data packets to at least one motor vehicle of the plurality of motor vehicles in a coordinate system local to the at least one vehicle of the plurality of motor vehicles.

13. The perception system of claim 12, wherein the computerized control unit is further configured to:

receive a set of localization data packets from each of the plurality of interconnected motor vehicles, each set of localization data packets comprising at least one of a heading and geographical coordinates of each respective motor vehicle;

determine an application for the received vehicle data packets, and based on the determined application the computerized control unit is configured to:

before transmitting the processed data packets, transform the vehicle data packets to reference a global geographical system, or transform the processed data packets to reference a shared coordinate system, the shared coordinate system being common to a subgroup of the plurality of interconnected motor vehicles, or transform the processed data packets such that the information about a surrounding environment is relative to a local coordinate system of the predefined motor vehicle of the plurality of interconnected motor vehicles.

14. The perception system of claim 12 wherein each motor vehicle of the plurality of interconnected motor vehicles comprises a vehicle system having a sensory system comprising a plurality of sensors that generate vehicle data packets comprising information about a surrounding environment of the motor vehicle.

15. The perception system of claim 14 wherein the vehicle system in each motor vehicle of the plurality of interconnected motor vehicles further comprises:

a localization system that generates localization data packets related to the motor vehicle, the localization data packets comprising at least one of a heading of the motor vehicle and geographical coordinates of the motor vehicle in a first local coordinate system;

a communication system that wirelessly transmits and receives data to/from at least another motor vehicle;

a computerized control unit operatively connected to the sensory system, the localization system, and the communication system, the computerized control unit configured to:

retrieve a first measurement of a position of an object in the surrounding environment relative to the motor vehicle from the sensory system;

retrieve the heading and/or the geographical coordinates of the motor vehicle;

receive external vehicle data packets and external localization data packets from a different motor vehicle in a second local coordinate system, the external vehicle data packets comprising a second measurement of a position of the object relative to the different motor vehicle and the external localization data packets comprising at least one of a heading of the different motor vehicle and geographical coordinates of the different motor vehicle;

retrieve a position of the different motor vehicle relative to the motor vehicle using the sensory system;

translate the external vehicle data packets in the second local coordinate system to the first local coordinate system by comparing the position of the different motor vehicle relative to the motor vehicle, the localization data packets and the external localization data packets; and process the translated external vehicle data packets and the vehicle data packets to generate a probable position of the object.

16. The perception system of claim 15 wherein the localization system retrieves data from one of a compass and a Global Navigation Satellite System to generate the localization data packets.

17. The perception system of claim 15 wherein the communication system comprises a radio transceiver.

18. The perception system of claim 14 wherein at least one sensor in the sensory system comprises one of a radar, a camera, and a LiDAR device.

19. The perception system of claim 12, wherein the probabilistic filter comprises a Kalman filter.

20. A perception system for managing a plurality of interconnected motor vehicles, the perception system comprising:

communication circuitry that transmits and receives data packets to and from at least one of the interconnected motor vehicles in a coordinate system local to the at least one interconnected motor vehicle of the plurality of motor vehicles;

a computerized control unit connected to the communication circuitry, the computerized control unit configured to:

receive a set of vehicle data packets from each of the plurality of interconnected motor vehicles each set of vehicle data packets comprising information about a surrounding environment of an associated motor vehicle;

receive a set of localization data packets from each of the plurality of interconnected motor vehicles in a coordinate system local to the interconnected motor vehicle of the plurality of motor vehicles, the localization data packets comprising a heading and/or geographical coordinates of each motor vehicle;

determine an application for the received vehicle data packets; and based on the determined application:

filter the received sets of vehicle data packets using a probabilistic filter to form a set of processed data packets; and transform the set of processed data packets such that the information about a surrounding environment is relative to a geographical coordinate system, or transform the processed data packets to reference a shared coordinate system, the shared coordinate system common to a subgroup of the plurality of interconnected motor vehicles, or transform the processed data packets such that the information about a surrounding environment is relative to a local coordinate system of a predefined motor vehicle of the plurality of interconnected motor vehicles.

* * * * *